United States Patent
Marusczyk et al.

(10) Patent No.: US 10,763,502 B2
(45) Date of Patent: Sep. 1, 2020

(54) ACTIVE MATERIAL FOR A POSITIVE ELECTRODE OF A BATTERY CELL, POSITIVE ELECTRODE, AND BATTERY CELL

(71) Applicant: Robert Bosch GmbH, Stuttgart (DE)

(72) Inventors: Anika Marusczyk, Stuttgart (DE); Thomas Eckl, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 15/760,079

(22) PCT Filed: Sep. 5, 2016

(86) PCT No.: PCT/EP2016/070803
§ 371 (c)(1),
(2) Date: Mar. 14, 2018

(87) PCT Pub. No.: WO2017/045943
PCT Pub. Date: Mar. 23, 2017

(65) Prior Publication Data
US 2019/0081324 A1    Mar. 14, 2019

(30) Foreign Application Priority Data
Sep. 16, 2015   (DE) .................. 10 2015 217 745

(51) Int. Cl.
*H01M 4/50*      (2010.01)
*H01M 4/13*      (2010.01)
(Continued)

(52) U.S. Cl.
CPC .......... *H01M 4/505* (2013.01); *H01M 4/131* (2013.01); *H01M 4/364* (2013.01); *H01M 4/366* (2013.01);
(Continued)

(58) Field of Classification Search
None
See application file for complete search history.

(56) References Cited

U.S. PATENT DOCUMENTS

| | | | |
|---|---|---|---|
| 7,521,152 B2 | 4/2009 | Takeda et al. | |
| 2014/0147727 A1 | 5/2014 | Park et al. | |

(Continued)

FOREIGN PATENT DOCUMENTS

| | | |
|---|---|---|
| DE | 102012208321 A1 | 11/2013 |
| DE | 102012214119 A1 | 2/2014 |

(Continued)

OTHER PUBLICATIONS

Asakura, et al.: "Cathode properties of layered structure Li2PtO3", Journal of Power Sources 81-82 (1999), pp. 388-392.
(Continued)

*Primary Examiner* — Barbara L Gilliam
*Assistant Examiner* — Angela J Martin
(74) *Attorney, Agent, or Firm* — Norton Rose Fulbright US LLP; Gerard Messina

(57) ABSTRACT

A positive active material for a positive electrode of a battery cell which includes a first component containing $Li_2MnO_3$, at least a portion of the manganese ions having been replaced by platinum ions and/or chromium ions. A positive (Continued)

electrode of a battery cell which includes a positive material, and a battery cell which includes at least one positive electrode are also described.

9 Claims, 2 Drawing Sheets

(51) Int. Cl.

| | | |
|---|---|---|
| *H01M 4/36* | (2006.01) | |
| *H01M 4/48* | (2010.01) | |
| *H01M 4/52* | (2010.01) | |
| *H01M 4/62* | (2006.01) | |
| *H01M 10/05* | (2010.01) | |
| *H01M 4/505* | (2010.01) | |
| *H01M 4/525* | (2010.01) | |
| *H01M 10/0525* | (2010.01) | |
| *H01M 4/485* | (2010.01) | |
| *H01M 4/131* | (2010.01) | |
| *H01M 4/02* | (2006.01) | |

(52) U.S. Cl.
CPC ........... *H01M 4/485* (2013.01); *H01M 4/525* (2013.01); *H01M 4/625* (2013.01); *H01M 10/0525* (2013.01); *H01M 2004/028* (2013.01); *Y02T 10/7011* (2013.01)

(56) References Cited

U.S. PATENT DOCUMENTS

| | | |
|---|---|---|
| 2014/0170452 A1* | 6/2014 | Abe .................. H01M 4/661 429/94 |
| 2014/0242468 A1 | 8/2014 | Song et al. |
| 2014/0272555 A1 | 9/2014 | Roelofs et al. |

FOREIGN PATENT DOCUMENTS

| | | |
|---|---|---|
| JP | 2008153214 A | 7/2008 |
| JP | 2012505520 A | 3/2012 |
| JP | 2012129102 A | 7/2012 |
| JP | 2012204291 A | 10/2012 |
| JP | 2017512374 | 5/2017 |
| KR | 101418065 B1 | 8/2014 |
| WO | 2013120724 A1 | 8/2013 |
| WO | 2013150937 A1 | 10/2013 |

OTHER PUBLICATIONS

Kim, et al.: "Synthesis of xLi"2MnO3 (1 − x)LiMO2 (M = Cr, Mn, Co, Ni) nanocomposites and their electrochemical properties", Material Research Bulletin 45 (2010), pp. 252-255.

Kim, et al.: Effects of transition metal doping and surface treatment to improve the electrochenical performance of Li2MnO3, J. Electroceram. 30 (2013), pp. 159-165.

International Search Report dated Jan. 12, 2017, of the corresponding International Application PCT/EP2016/070803 filed Sep. 5, 2016.

* cited by examiner

ACTIVE MATERIAL FOR A POSITIVE ELECTRODE OF A BATTERY CELL, POSITIVE ELECTRODE, AND BATTERY CELL

The present invention relates to an active material (A) for a positive electrode of a battery cell which includes a first component (A1), containing $Li_2MnO_3$, that is doped with platinum ions and/or chromium ions. Moreover, the present invention relates to a positive electrode of a battery cell which includes an active material (A) according to the present invention, and a battery cell which includes at least one positive electrode according to the present invention.

BACKGROUND INFORMATION

The storage of electrical energy has become increasingly important in recent decades. Electrical energy may be stored with the aid of batteries. Batteries convert chemical reaction energy into electrical energy. A distinction is made between primary batteries and secondary batteries. Primary batteries are non-rechargeable, while secondary batteries, also referred to as accumulators, are rechargeable. A battery includes one or multiple battery cells.

In particular, so-called lithium-ion battery cells are used in an accumulator. They are characterized, among other features, by high energy densities, thermal stability, and extremely low self-discharge.

Lithium-ion battery cells include a positive electrode and a negative electrode. The positive and negative electrodes each include a current collector, to which a positive or negative active material is applied.

The positive and negative active material is capable of reversible intercalation and deintercalation of lithium ions.

The active material for the negative electrode is, for example, amorphous silicon which may form alloy compounds with lithium atoms. However, carbon compounds such as graphite are also widely used as active material for negative electrodes. Lithium atoms are intercalated into the active material of the negative electrode.

A lithium-containing metal oxide or a lithium-containing metal phosphate is generally used as active material for the positive electrode. In particular in applications in which a high energy density is necessary, so-called high-energy materials such as high-energy (HE) nickel-cobalt-manganese (NCM) electrodes (for example, $LiMO_2:Li_2MnO_3$, where M=Ni, Co, Mn) are used. A generic battery that uses such an HE-NCM electrode is described in German Patent Application No. DE 10 2012 208 321 A1, for example.

During operation of the battery cell, i.e., during a discharging operation, electrons flow in an external circuit from the negative electrode to the positive electrode. During a discharging operation, lithium ions migrate from the negative electrode to the positive electrode within the battery cell. In the process, the lithium ions are reversibly deintercalated from the active material of the negative electrode, also referred to as delithiation. During a charging operation of the battery cell, the lithium ions migrate from the positive electrode to the negative electrode. In the process, the lithium ions are reversibly reintercalated into the active material of the negative electrode, also referred to as lithiation.

The electrodes of the battery cell have a foil-like design and are wound to form an electrode winding, with a separator situated in between which separates the negative electrode from the positive electrode. Such an electrode winding is also referred to as a "jelly roll." The electrodes may also be layered one above the other to form an electrode stack.

The two electrodes of the electrode winding or of the electrode stack are electrically connected with the aid of collectors to poles of the battery cell, also referred to as terminals. A battery cell generally includes one or multiple electrode windings or electrode stacks. The electrodes and the separator are surrounded by an electrolyte composition which is generally liquid. The electrolyte composition is conductive for the lithium ions, and allows transport of the lithium ions between the electrodes.

U.S. Patent Appl. Pub. No. 2014/0242468 A1 describes a positive active material that contains a superlithiated lithium-transition metal oxide, a portion of the lithium ions having been replaced by transition metal ions.

U.S. Patent Appl. Pub. No. 2014/0147727 A1 describes an active material that includes a lithium-manganese oxide of formula x $MnO_2 \cdot (1-x)$ $Li_2MnO_3$ (where 0<x<1) and a lithium-containing transition metal oxide such as $Li_2Ni_xCu_{1-x}O_2$ (where 0≤x≤1).

Battery cells that include conventional HE-NCM electrodes are characterized in that they deliver high cell voltages at the beginning of the service life of the cell, but over the service life are subject to significant losses (so-called "voltage fade"). The same applies for the capacity of the cell (so-called "capacity fade"). The object of the present invention, therefore, is to provide an active material for a positive electrode, which has a high cell voltage and capacity even after a long service time of the cell.

SUMMARY

An active material (A) for a positive electrode of a battery cell, in particular for a lithium-ion battery cell, is provided which includes a first component (A1) containing a metal oxide of formula (I):

$$Li_2Mn_{1-y-z}Cr_yPt_zO_3 \qquad (I)$$

where 0≤y<1, 0≤z<1, and 0<y+z<1. It is preferred that 0<y+z<0.5, in particular 0<y+z<0.1.

Due to the doping, preferably a proportion between 0.1 atom % and 50 atom % of the manganese ions $Mn^{4+}$ of the metal oxide $Li_2MnO_3$ of first component (A1) of active material (A) of the positive electrode is replaced by the chromium ions $Cr^{4+}$ and/or platinum ions $Pt^{4+}$ (i.e., 0.001<y+z<0.5). With regard to the material costs, preferably a smaller proportion of platinum ions is used. In particular, preferably a proportion of 1 atom % to 10 atom % of the manganese ions of the $Li_2MnO_3$ is replaced by platinum ions $Pt^{4+}$ (i.e., 0.01<z<0.1). Preferably a total proportion of 1 atom % to 10 atom % of the manganese ions of the $Li_2MnO_3$ is replaced by chromium ions $Cr^{4+}$ and platinum ions $Pt^{4+}$ (i.e., 0.01<y+z<0.1).

In one specific embodiment of the present invention, active material (A) includes a first component (A1) containing a compound of general formula (I), where z=0, i.e., no platinum having been added as doping metal.

In another specific embodiment of the present invention, active material (A) includes a first component (A1) containing a compound of general formula (I), where y=0, i.e., no chromium having been added as doping metal.

In one specific embodiment of the present invention, active material (A) includes a first component (A1) containing a compound of general formula (I), where z>0 and y>0, platinum as well as chromium thus having been added as doping metal. In this case, for cost reasons it is preferred that more chromium than platinum is added. A Cr:Pt ratio of 2:1, in particular 3:1, is preferably set.

According to one advantageous embodiment of the present invention, component (A1) is additionally doped with sodium ions, a portion of the lithium ions of component (A1) being replaced by sodium ions. The rate capability of active material (A) is thus positively influenced. The advantageous embodiment therefore includes a component (A1) containing a compound of general formula (II):

$$Li_{2-x}Na_xMn_{1-y-z}Cr_yPt_zO_3 \quad\quad (II)$$

where y and z have the meanings described above, and $0 \leq x \leq 2$. It is preferred that $0.1 \leq x \leq 1$.

Active material (A) preferably includes a second component (A2) that contains $LiMO_2$. M is a transition metal preferably selected from the elements nickel, cobalt, and manganese. Active material (A), which includes components (A1) and (A2), allows a relatively large capacity of the battery cell combined with a relatively high voltage.

Initially inactive first component (A1) of active material (A) of the positive electrode, which contains the metal oxide $Li_2MnO_3$, is activated during formation of the battery cell, with irreversible cleavage of oxygen. The formation of the battery cell takes place in that a defined voltage is applied to the battery cell for the first time, and a defined current flows through the battery cell for the first time. Such a process for forming a battery cell, in which formation currents are applied to the battery cell to activate electrochemical processes, is described in German Patent Application No. DE 10 2012 214 119 A1, for example.

The doping of first component (A1), which contains the metal oxide $Li_2MnO_3$, takes place prior to the formation and activation of the battery cell.

During the doping, portions of the manganese ions $Mn^{4+}$ of the metal oxide $Li_2MnO_3$ of first component (A1) of active material (A) of positive electrode are replaced by the chromium ions $Cr^{4+}$ and/or platinum ions $Pt^{4+}$. The chromium ions and platinum ions are capable of assuming the oxidation state +4 ($Cr^{4+}$ and $Pt^{4+}$) as well as the oxidation state +6 ($Cr^{6+}$ and $Pt^{6+}$), and with sufficient voltage level are redox-active. The ions of the doping metals may thus take part in the charge compensation during the charging and discharging of the battery cell. The irreversible oxygen loss is reduced due to the provided doping of the positive active material. Since such a reduction of the defects in the material is achieved, the destabilization of the material structure is also reduced due to rearrangements and migrations of transition metals in the positive active material. This results in stabilization of the capacity and voltage level, since the active material is subject to fewer changes.

In addition, the metal ions provided for the doping have sufficient electronegativity to bind electrons to them and not release them to neighboring manganese ions. Thus, the generation of electrochemically undesirable $Mn^{3+}$ ions is prevented. Another advantage of the chromium ions is the relatively low cost and the low weight, which has a positive effect on the specific capacity.

The doping of first component (A1) containing the metal oxide $Li_2MnO_3$ may already take place during the manufacture of the component. For this purpose, for example a desired proportion of the manganese compound used for the production of $Li_2MnO_3$ may be replaced by a corresponding chromium or platinum compound or by a mixture of the chromium and platinum compounds. Without being limited thereto, for example $CrO_2$ and/or $PtO_2$ may be used as starting material, and a portion of the $MnO_2$ customarily used may be replaced by same. Likewise, a portion of the lithium compound ($LiCO_3$, for example) customarily used may be replaced by the corresponding sodium compound ($NaCO_3$, for example).

The doping of first component (A1) containing the metal oxide $Li_2MnO_3$ may also be subsequently achieved. For this purpose, the $Li_2MnO_3$ is for example treated with an acid ($HNO_3$, for example) and subsequently treated with an aqueous solution of a chromium or platinum salt. Such a method is described, for example, in U.S. Patent App. Pub. No. 2014/0242468 A1, for example.

The doping generally results in an active material (A) of the positive electrode which includes a first component (A1) containing the doped metal oxide $Li_2MnO_3$, and a second component (A2) containing the NCM compound $LiMO_2$, according to following formula (III):

$$n(LiMO_2):1-n(Li_{2-x}Na_xMn_{1-y-z}Cr_yPt_zO_3) \quad\quad (III)$$

where M, x, z, and y have the meanings described above, and $0 \leq n \leq 1$. It is preferred that $0 < n < 1$, in particular $0.2 \leq n \leq 0.8$.

Moreover, a positive electrode of a battery cell is provided which includes an active material (A) according to the present invention. In addition to active material (A), the positive electrode includes in particular a current collector on which active material (A) is applied. A metal foil, for example a copper or aluminum foil, is preferably used as the current collector. In addition, additives may be added to active material (A) prior to the application on the current collector. Named in particular are conductive additives such as conductive carbon black and binders such as styrene-butadiene copolymer (SBR), polyvinylidene fluoride (PVDF), polytetrafluoroethene (PTFE), and ethylene propylene diene terpolymer (EPDM).

According to one advantageous refinement of the present invention, a coating containing aluminum fluoride ($AlF_3$) is applied to active material (A) of the positive electrode. A coating containing aluminum fluoride ($AlF_3$) on active material (A) of the positive electrode has a positive effect on the capacity of the battery cell.

In particular, the coating prevents or reduces contact of active material (A) of the positive electrode with an electrolyte composition contained in the battery cell. Elutriation of transition metals from active material (A) of the positive electrode and migration of elutriated transition metals to the negative electrode of the battery cell are likewise prevented or reduced.

According to another advantageous refinement of the present invention, a coating containing carbon is applied to active material (A) of the positive electrode. Such a coating ensures homogeneous electronic contacting of the positive electrode.

The $AlF_3$-containing coating and the carbon-containing coating may also be applied to active material (A) of the positive electrode together, in particular one above the other, i.e., in layers.

Furthermore, a battery cell is provided which includes at least one positive electrode according to the present invention. In addition, the battery cell includes at least one negative electrode, and an electrolyte composition that allows the transport of the lithium ions from one electrode to the other. To avoid direct contact between the electrodes, the battery cell also preferably includes at least one separator situated between the electrodes. The separator preferably contains polymers such as polyolefins, polyesters, and fluorinated polymers. Particularly preferred polymers are polyethylene (PE), polypropylene (PP), polyethylene terephthalate (PET), polytetrafluoroethene (PTFE), and polyvinylidene fluoride (PVDF).

A battery cell according to the present invention is advantageously used in an electric vehicle (EV), in a hybrid vehicle (HEV), in a plug-in hybrid vehicle (PHEV), in a tool, or in a consumer electronic product. Tools are understood in particular to mean tools for home use and garden tools. Consumer electronic products are understood in particular to mean mobile telephones, tablet PCs, or notebooks.

Due to the partial replacement of the manganese ions $Mn^{4+}$ in the metal oxide of first component (A1) of active material (A) of the positive electrode by chromium ions and/or platinum ions, an active material (A) is provided which ensures a stable voltage over a relatively long time period and a large number of cycles when used in a lithium-ion battery cell. Likewise, the capacity of the lithium-ion battery cell remains stable over a relatively long time period and a large number of cycles. Losses in voltage and capacity are significantly reduced. The service life of the battery is thus increased, thus enabling commercial use in particular of lithium-ion batteries with an NCM compound in active material (A) of the positive electrode.

BRIEF DESCRIPTION OF THE DRAWINGS

Specific embodiments of the present invention are explained in greater detail below with reference to the figures.

DETAILED DESCRIPTION OF EXAMPLE EMBODIMENTS

Figure 1:
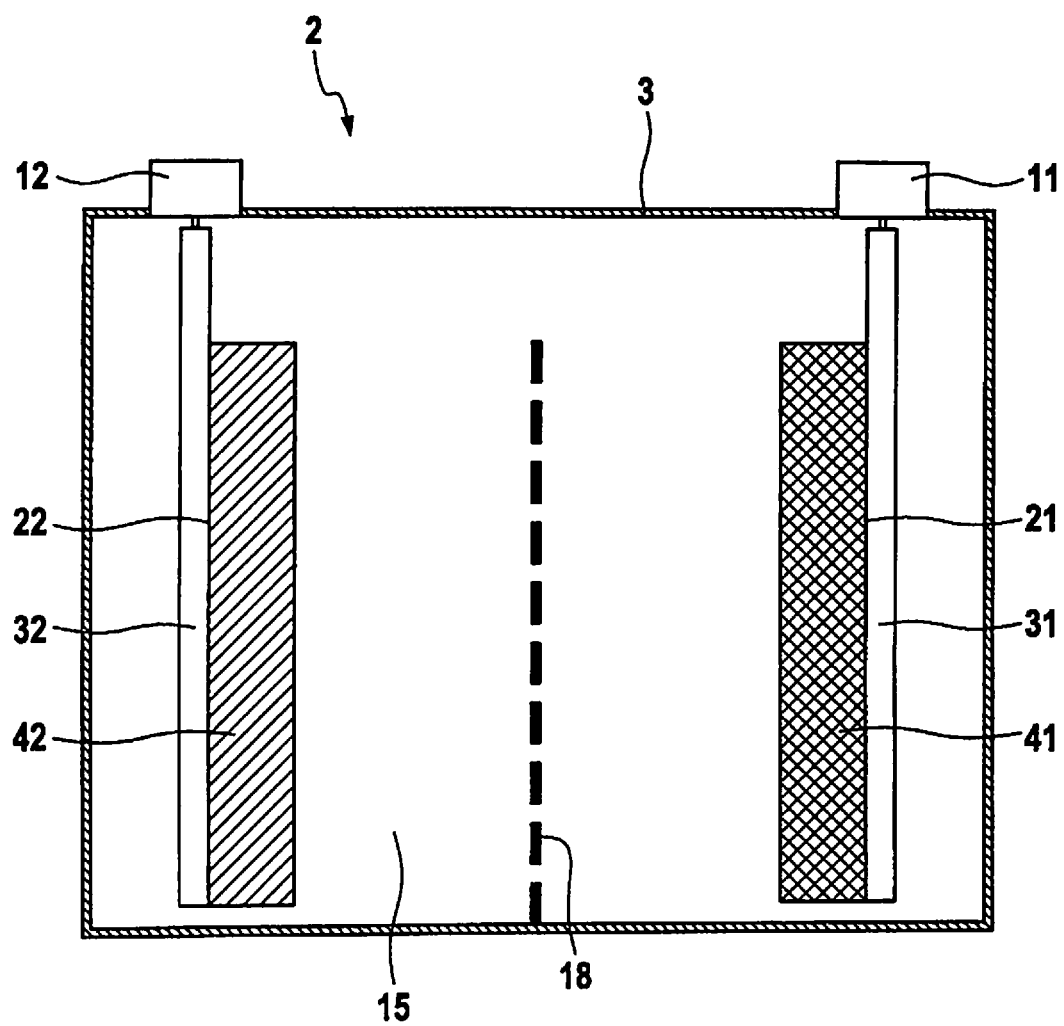
FIG. 1 shows a schematic illustration of a battery cell.

A battery cell 2 is schematically illustrated in FIG. 1. Battery cell 2 includes a cell housing 3 having a prismatic design, in the present case a cuboidal design. In the present case, cell housing 3 has an electrically conductive design and is made of aluminum, for example. However, cell housing 3 may also be made of an electrically insulating material, for example plastic.

Battery cell 2 includes a negative terminal 11 and a positive terminal 12. A voltage provided by battery cell 2 may be tapped via terminals 11, 12. In addition, battery cell 2 may also be charged via terminals 11, 12. Terminals 11, 12 are situated spaced apart from one another on a top surface of prismatic cell housing 3.

An electrode winding which includes two electrodes, namely, a negative electrode 21 and a positive electrode 22, is situated within cell housing 3 of battery cell 2. Negative electrode 21 and positive electrode 22 each have a foil-like design, and are wound to form an electrode winding with a separator 18 situated in between. It is also conceivable to provide multiple electrode windings in cell housing 3. An electrode stack, for example, may also be provided instead of the electrode winding.

Negative electrode 21 includes a negative active material 41 which has a foil-like design. Negative active material 41 contains silicon or a silicon-containing alloy as the base material.

Negative electrode 21 also includes a current collector 31, which likewise has a foil-like design. Negative active material 41 and current collector 31 are placed flatly against one another and joined together. Current collector 31 of negative electrode 21 has an electrically conductive design and is made of a metal, for example copper. Current collector 31 of negative electrode 21 is electrically connected to negative terminal 11 of battery cell 2.

In the present case, positive electrode 22 is a high-energy (HE) nickel-cobalt-manganese (NCM) electrode. Positive electrode 22 includes a positive active material (A) 42 which is present in particle form. Additives, in particular conductive carbon black and binder, are situated between the particles of positive active material (A) 42. Positive active material (A) 42 and the additives form a composite which has a foil-like design.

Positive active material (A) 42 includes a first component (A1) containing $Li_2MnO_3$. The first component of positive active material (A) 42 also has doping with chromium ions and platinum ions that replace at least a portion of the manganese ions of the component $Li_2MnO_3$. First component (A1) may be additionally doped with sodium ions, so that a portion of the lithium ions is replaced by sodium ions. For example, first component (A1) of active material (A) includes a compound of formula $Li_{1.5}Na_{0.5}Mn_{0.6}Cr_{0.35}Pt_{0.05}O_3$.

Positive active material (A) 42 also includes a second component (A2) containing an NCM compound, namely, $LMO_2$. M is a transition metal selected in particular from nickel, cobalt, and manganese. Further components of positive active material (A) 42 are in particular PVDF binder, graphite, and carbon black.

Positive electrode 22 also includes a current collector 32 which likewise has a foil-like design. The composite, made up of positive active material (A) 42 and the additives, and current collector 32 are placed flatly against one another and joined together. Current collector 32 of positive electrode 22 has an electrically conductive design and is made of a metal, for example aluminum. Current collector 32 of positive electrode 22 is electrically connected to positive terminal 12 of battery cell 2.

Negative electrode 21 and positive electrode 22 are separated from one another by separator 18. Separator 18 likewise has a foil-like design. Separator 18 has an electronically insulating design, but is ionically conductive, i.e., is permeable for lithium ions.

Cell housing 3 of battery cell 2 is filled with a liquid aprotic electrolyte composition 15 or with a polymer electrolyte. Electrolyte composition 15 surrounds negative electrode 21, positive electrode 22, and separator 18. Electrolyte composition 15 is also ionically conductive, and includes, for example, a mixture of at least one cyclic carbonate (for example, ethylene carbonate (EC), propylene carbonate (PC), butylene carbonate (BC)) and at least one linear carbonate (for example, dimethylene carbonate (DMC), diethyl carbonate (DEC), methylethyl carbonate (MEC)) as solvent, and a lithium salt ($LiPF_6$, $LiBF_4$, for example) as additive.

Figure 2:
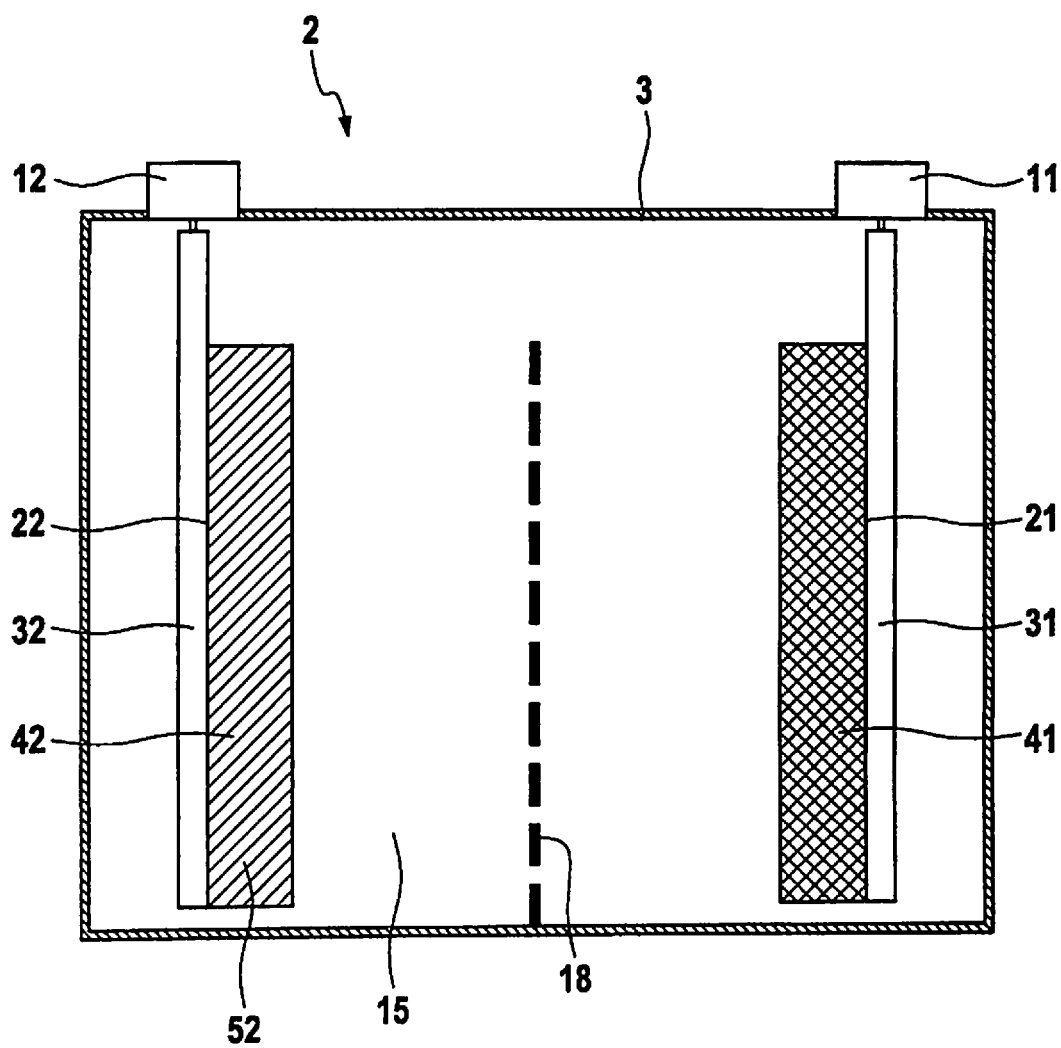
FIG. 2 shows a schematic illustration of a modification of the battery cell from FIG. 1.

FIG. 2 schematically illustrates a modification of battery cell 2 from FIG. 1. Modified battery cell 2 likewise includes a cell housing 3 which has a prismatic design, in the present case a cuboidal design. Battery cell 2 is very similar to battery cell 2 from FIG. 1. Therefore, in particular differences from battery cell 2 from FIG. 1 are discussed below.

A coating 52 is applied to the particles of positive active material (A) 42. The particles of positive active material (A) 42 are enclosed by coating 52. Coating 52 thus envelops the particles of positive active material (A) 42.

In the present case, coating 52 contains aluminum fluoride ($AlF_3$). Coating 52 prevents or reduces contact of positive active material (A) 42 with electrolyte composition 15 contained in cell housing 3 of battery cell 2. Elutriation of transition metals from positive active material (A) 42 and migration of elutriated transition metals to negative electrode 21 of battery cell 2 are likewise prevented or reduced.

Coating 52 may also contain carbon. A coating 52 of this type ensures homogeneous electronic contacting of positive electrode 22. Coating 52 may in particular have a multilayer design, and, for example, may contain a layer of aluminum fluoride ($AlF_3$) and a layer of carbon.

The present invention is not limited to the exemplary embodiments described here and the aspects highlighted therein. Rather, numerous modifications within the range set forth in the claims are possible which are within the scope of activities carried out by those skilled in the art.

What is claimed is:

1. A positive active material for a positive electrode of a battery cell, comprising:
   a first component containing a compound of formula $Li_2MnO_3$;
   wherein at least a portion of the manganese ions have been replaced by at least one of platinum ions and chromium ions, and
   wherein the first component includes a compound of general formula (II):

$$Li_{2-x}Na_xMn_{1-y-z}Cr_yPt_zO_3 \qquad (II)$$

where $0 < x \leq 2$;
   $0 \leq y < 1$;
   $0 \leq z < 1$; and
   $0 < y+z < 1$.

2. The positive active material as recited in claim 1, wherein $0 < y+z < 0.5$.

3. The positive active material as recited in claim 1, wherein $0.1 \leq x \leq 1$.

4. The positive active material as recited in claim 1, wherein the positive active material further includes a second component containing $LiMO_2$, M being a transition metal selected from at least one of the elements of nickel, cobalt, and manganese.

5. A positive electrode of a battery cell, comprising:
   a positive active material including a first component containing a compound of formula $Li_2MnO_3$;
   wherein at least a portion of the manganese ions have been replaced by at least one of platinum ions and chromium ions, and
   wherein the first component includes a compound of general formula (II):

$$Li_{2-x}Na_xMn_{1-y-z}Cr_yPt_zO_3 \qquad (II)$$

where $0 < x \leq 2$;
   $0 \leq y < 1$;
   $0 \leq z < 1$; and
   $0 < y+z < 1$.

6. The positive electrode as recited in claim 5, wherein the positive electrode further includes a coating containing aluminum fluoride applied to the positive active material.

7. The positive electrode as recited in claim 5, wherein the positive electrode further includes a coating containing carbon applied to the positive active material.

8. A battery cell, comprising:
   at least one positive electrode, wherein the positive electrode includes a positive active material, wherein the positive active material includes a first component containing a compound of formula $Li_2MnO_3$, and wherein at least a portion of the manganese ions have been replaced by at least one of platinum ions and chromium ions, and
   wherein the first component includes a compound of general formula (II):

$$Li_{2-x}Na_xMn_{1-y-z}Cr_yPt_zO_3 \qquad (II)$$

where $0 < x \leq 2$;
   $0 \leq y < 1$;
   $0 \leq z < 1$; and
   $0 < y+z < 1$.

9. A method of using a battery cell, the method comprising:
   providing a battery cell, which includes at least one positive electrode, wherein the positive electrode includes a positive active material, wherein the positive active material includes a first component containing a compound of formula $Li_2MnO_3$, and wherein at least a portion of the manganese ions have been replaced by at least one of platinum ions and chromium ions; and
   using the battery cell in one of an electric vehicle, a hybrid vehicle, a plug-in hybrid vehicle, a tool, and a consumer electronic product,
   wherein the first component includes a compound of general formula (II):

$$Li_{2-x}Na_xMn_{1-y-z}Cr_yPt_zO_3 \qquad (II)$$

where $0 < x \leq 2$;
   $0 \leq y < 1$;
   $0 \leq z < 1$; and
   $0 < y+z < 1$.

* * * * *

UNITED STATES PATENT AND TRADEMARK OFFICE
CERTIFICATE OF CORRECTION

PATENT NO. : 10,763,502 B2
APPLICATION NO. : 15/760079
DATED : September 1, 2020
INVENTOR(S) : Anika Marusczyk and Thomas Eckl It is certified that error appears in the above-identified patent and that said Letters Patent is hereby corrected as shown below:

In the Specification

Please change formula (II) in Column 3, Line 10 from:
"$Li_{2-x}Na_xMn_{1-y-z}Cr_yPt_2O_3$"
To:
-- $Li_{2-x}Na_xMn_{1-y-z}Cr_yPt_zO_3$ --

Please change formula (III) in Column 4, Line 18 from:
"$n(LiMO_2):1 - n\ (Li_{2-x}Na_xMn_{1-y-z}Cr_yPt_2O_3)$"
To:
-- $n(LiMO_2):1 - n(Li_{2-x}Na_xMn_{1-y-z}Cr_yPt_zO_3)$ --

In the Claims

Please change formula (II) in Column 8, Line 42, Line 9 from:
"$Li_{2-x}Na_xMn_{1-y-z}Cr_yPt_2O_3$"
To:
-- $Li_{2-x}Na_xMn_{1-y-z}Cr_yPt_zO_3$ --

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*